US009713074B2

(12) United States Patent
Yepeź et al.

(10) Patent No.: US 9,713,074 B2
(45) Date of Patent: Jul. 18, 2017

(54) NETWORK ASSOCIATION IN AN ENVIRONMENT WITH HIDDEN NETWORKS

(75) Inventors: Roberto Gabriel Yepeź, San Francisco, CA (US); Mitchell D. Adler, Cupertino, CA (US); Charles Francis Dominguez, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1546 days.

(21) Appl. No.: 12/541,108

(22) Filed: Aug. 13, 2009

(65) Prior Publication Data

US 2010/0309815 A1 Dec. 9, 2010

Related U.S. Application Data

(60) Provisional application No. 61/184,738, filed on Jun. 5, 2009.

(51) Int. Cl.
*H04W 48/20* (2009.01)
*H04W 48/16* (2009.01)
*H04L 12/46* (2006.01)

(52) U.S. Cl.
CPC ......... *H04W 48/16* (2013.01); *H04L 12/4625* (2013.01); *H04W 48/20* (2013.01)

(58) Field of Classification Search
CPC .... H04L 12/4625; H04W 48/16; H04W 48/20
USPC ...... 370/254, 331, 338, 332; 455/434, 426.1
See application file for complete search history.

(56) References Cited

U.S. PATENT DOCUMENTS

| | | |
|---|---|---|
| 2004/0266430 A1 | 12/2004 | Fudim et al. |
| 2006/0045018 A1* | 3/2006 | Masri ............................ 370/241 |
| 2006/0189311 A1 | 8/2006 | Cromer et al. |
| 2007/0026856 A1* | 2/2007 | Krantz et al. ............. 455/426.1 |
| 2007/0091861 A1* | 4/2007 | Gupta et al. .................. 370/338 |
| 2007/0268877 A1 | 11/2007 | Buckley et al. |
| 2007/0275701 A1 | 11/2007 | Jonker |
| 2008/0014934 A1* | 1/2008 | Balasubramanian et al. ............................. 455/434 |
| 2008/0082543 A1* | 4/2008 | Abhishek et al. .............. 707/10 |
| 2008/0130595 A1* | 6/2008 | Abdel-Kader ................ 370/338 |
| 2008/0198811 A1* | 8/2008 | Deshpande et al. .......... 370/332 |
| 2009/0075653 A1* | 3/2009 | Yeom ............................ 455/434 |
| 2009/0080381 A1* | 3/2009 | Yashar et al. ................. 370/331 |
| 2010/0184395 A1* | 7/2010 | Bagge et al. ............. 455/161.1 |

OTHER PUBLICATIONS

Wifi Track, Wifi Track (Find Free WiFi), Bitrino, Inc. Apple App Store, Feb. 4, 2009, http://itunes.apple.com/WebObjects/MZStore.woa/wa/viewSoftware?id=294771472&mt=8.

* cited by examiner

*Primary Examiner* — Derrick Ferris
*Assistant Examiner* — Mandish Randhawa
(74) *Attorney, Agent, or Firm* — Sterne, Kessler, Goldstein & Fox P.L.L.C.

(57) ABSTRACT

Embodiments of the invention perform a preliminary scan for information automatically transmitted by available wireless access points. The information transmitted by access points (e.g., identity information) and information derived from the transmission (e.g., signal strength) is used to prioritize the available wireless access points before direct scanning takes place.

15 Claims, 8 Drawing Sheets

NETWORK ASSOCIATION IN AN ENVIRONMENT WITH HIDDEN NETWORKS

This application claims priority to U.S. Provisional Patent Application No. 61/184,738 filed on Jun. 5, 2009, which provisional application is incorporated herein by reference in its entirety; this application claims the benefit of the provisional's filing date under 35 U.S.C. §119(e).

FIELD OF THE INVENTION

Embodiments of the invention are generally directed toward networking of data processing systems, and more specifically directed toward association of a data processing system with a wireless network access point.

BACKGROUND

Users of data processing systems, such as desktop computers, laptop computers, and hand-held devices, frequently use their devices to access information over a network, such as the internet. Connecting the device to a network may involve plugging a cable from the device into a wall socket.

Alternatively, a user may connect to a network wirelessly through a wireless access point. A device without a wireless connection that is instructed to acquire one can be configured to automatically try to join a network through a wireless access point. The device scans for available wireless access points using its radio equipment.

Some wireless access points do not fully disclose their identity. The device probes each detected hidden access point directly. Directly probing each hidden access point takes time.

SUMMARY

Embodiments of the invention perform a preliminary scan for information automatically transmitted by available wireless access points. The information transmitted by access points (e.g., identity information) and derived from the transmission (e.g., signal strength) is used to prioritize the available wireless access points before direct scanning takes place.

In one embodiment, wireless access points are sorted using information transmitted by the access points. If the information describing a particular access point is incomplete, the sorting uses default or selected values in place of the missing data. This allows sorting of the access points without obtaining the actual values, which may be a time-consuming process. The most preferred access point is selected from the sorted list. If the most preferred access point has incomplete information, actual values may obtained from the most preferred access point after the selection.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

Figure 1:
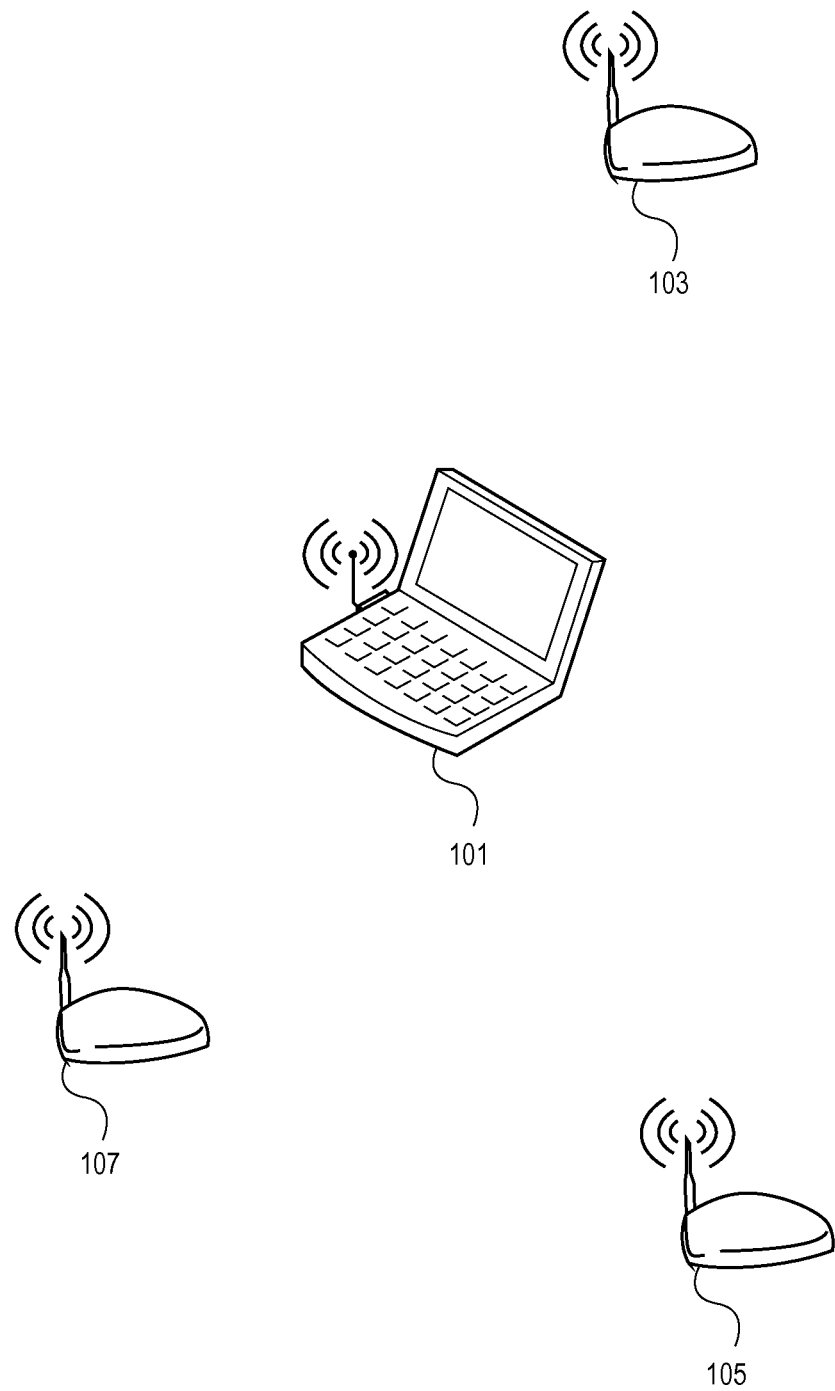
FIG. 1 shows a diagram illustrating a device and wireless access points according to an embodiment of the invention.

FIG. 1 shows a diagram of an embodiment of the invention. Three wireless access points 103, 105, and 107 (e.g., cell towers, 802.11b, etc.) are potentially available to device 101. Device 101 may use an embodiment of the invention to select and connect to one of the three access points.

Device 101 may utilize a connection ordering. For example, the first network the device 101 attempts to join may always be the last network to which the device 101 was connected, if that network is available. If the last network is not available, device 101 may attempt to automatically join an available network to which the device 101 has been previously connected. This may be referred to as an "autojoin" feature and may provide convenience to the user, since user interaction is not required. If no previously connected networks are available, the device may then prompt user and request instructions. For example, the device 101 may list other available networks to which the device 101 has not been previously connected and provide that list to a user.

Network access points may be categorized as hidden or broadcast, as described below. The identity of a hidden network may be unknown to the device 101 without additional information. Since a hidden network may be a known network (i.e., previously connected network), an available hidden network may be eligible to be automatically joined by the device 101. However, before the device 101 can autojoin a hidden network, it must identify the hidden network as being a known network. Generally, identifying a hidden network requires more time than identifying a broadcast network, since a broadcast network provides necessary identification information without being scanned directly.

Scanning every available hidden network to determine its identity may cause an unnecessary delay in obtaining a connection to a network. Embodiments of the invention perform a preliminary scan for information automatically transmitted by available wireless access points. Device 101 may use information transmitted by access points (e.g., identity information) and information derived from the transmission (e.g., signal strength) to prioritize the available wireless access points before direct scanning of hidden access points takes place. If, for example, a known broadcast network access point is high ranking, the device 101 may automatically associate the device with the high ranking access point without incurring any delay attributable to performing a directed scan, even if hidden access points are available. If the highest ranking access point is a hidden access point, device 101 may directly scan the hidden access point, determine that the hidden access point is a known access point, and connect to the hidden access point. This incurs only one directed scan delay per known hidden network, rather than one per known hidden network for each channel with known networks.

Using the example of a wireless LAN (Local Area Network) using the IEEE 802.11 standards, an access point may be a "broadcast" access point, in that it periodically broadcasts a beacon frame containing information needed to identify and connect to the access point. Another type of 802.11 access point would be a hidden access point, which does not include its SSID (Service Set IDentifier) in the broadcast beacon frame. A hidden access point is not defined in the 802.11 standard, and may be considered a breach of the standard. One characteristic of a hidden access point is that it takes significantly longer to identify a hidden access point than a broadcast access point, since a hidden access point must be directly scanned in order to obtain its identity information (e.g., an SSID).

In IEEE 802.11, all access points (APs) broadcast a beacon frame periodically (with some configurable period, where 100 ms is the most common). Devices such as device 101 can detect access points via these broadcasts, or they may actively probe the channel for APs by sending a probe request. Probe requests can be either undirected or directed. Undirected probe requests contain a "wildcard" SSID, which indicates that all APs on the channel should send a probe response (regardless of their SSID). Directed probe requests contain a specific SSID; only APs on that channel whose SSID matches that in the probe request should respond. Hidden APs will send beacons, but do not include their SSID in the beacon contents. They also (in general) do not respond to undirected probe requests; they will only respond to directed probe requests with the correct SSID. As a result, identifying an available hidden network on a particular channel requires that device 101 issue a directed probe request on that channel for each known hidden network. If the AP responds (i.e., it is found by the scan) it confirms that the AP's SSID matches the SSID of the network the device is looking for. This process must be repeated if multiple hidden networks must be identified.

In IEEE 802.11, different methods of detecting an AP require different amounts of time to return reliable results. Detecting an AP from only its beacons requires that a device (such as device 101) listen on a channel for at least a beacon period (usually 100 ms) in order to have reasonable probability of detecting the network. This ensures that at least one beacon will arrive while the device is listening. Sending a probe request is much faster as APs should respond almost immediately to a valid probe request, subject to the limitations of their own processing power and available bandwidth. Both methods of detection are commonly used.

Generally, when a device seeks to connect to a network (e.g., LAN, WAN, Internet, etc.) through an access point, the device will attempt to connect to its most recently used access point. If the previously connected access point is a hidden access point, this process may take somewhat longer than if it is a broadcast access point. However, the cost of directly interrogating a hidden access point in terms of time is outweighed by the benefits of connecting to the previously connected access point. If the previously connected access point is unavailable, the device may prompt the user or attempt to automatically join an available access point. For security and other reasons, autojoin functionality generally connects to a wireless access point previously connected to by the device, which indicates that the user selected and approved the access point at an earlier time.

Figure 2:
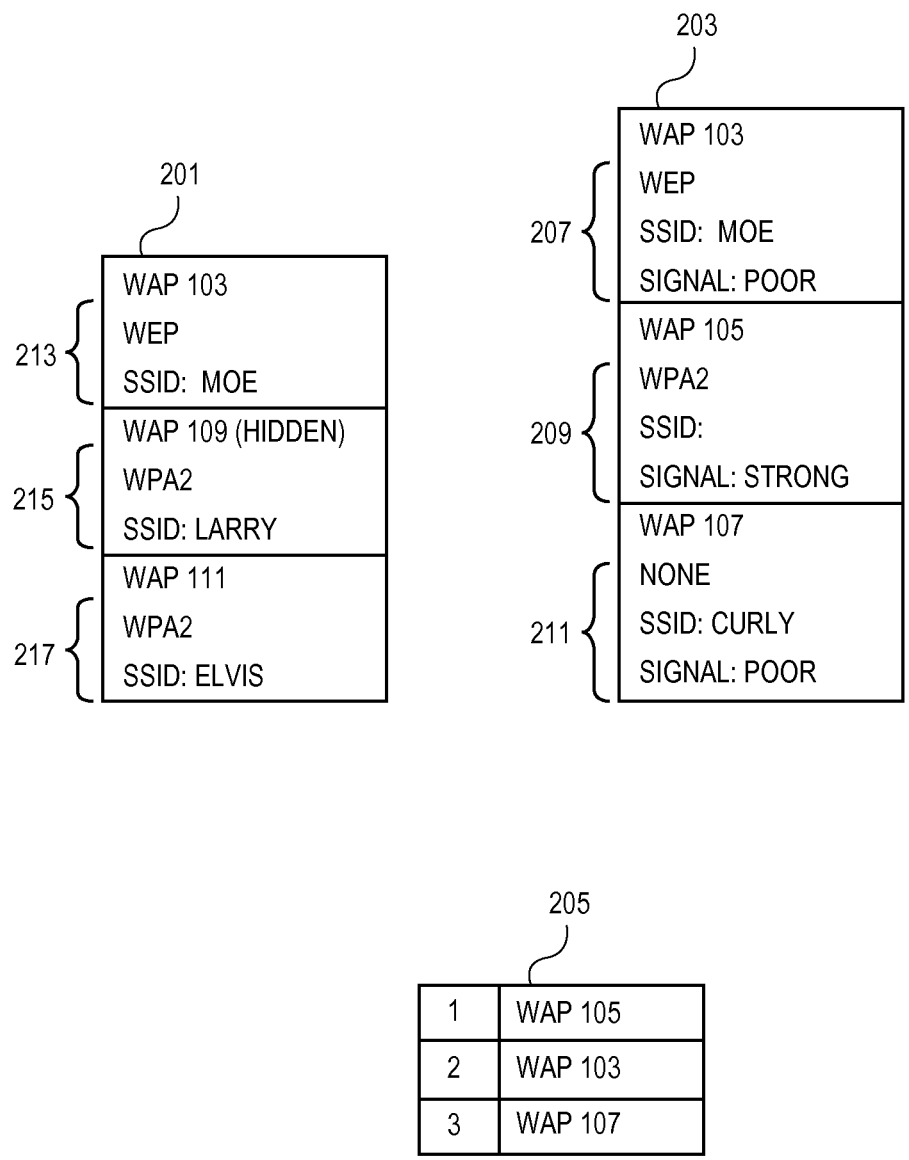
FIG. 2 shows a diagram illustrating various lists of access points according to an embodiment of the invention.

FIG. 2 shows a diagram of available networks 203, which correspond to access points 103, 105, and 107 from FIG. 1. Known access points 201 correspond to access points the device has connected to in the past and therefore are eligible for automatic connection. Access points in available access points 203 have various characteristics 207, 209, and 211 determined by the device 101 from their beacon frames. WAP 103, for example, uses WEP (Wired Equivalent Privacy) security, has the SSID of "Moe" and has poor signal strength relative to device 101. WAP 105 uses WPA2 (Wi-Fi Protected Access) security, does not report its SSID (i.e., WAP 105 is a hidden access point) and has a strong signal strength relative to device 101. WAP 107 uses no security, reports the SSID of "Curly" and has poor signal strength.

Known access points 201 include WAP 103, 109, and WAP 111, which have characteristics 213, 215, and 217 stored by device 101 from previous connections. WAP 103 is known to device 101, and is recognized during this scan for available access points because it is a broadcast access point. WAP 109 is a hidden access point, so device 101 does not yet know whether it is available based only on the broadcast scan of beacon frames. WAP 111 is a broadcast access point which isn't in the list of available access points, so device 101 can determine that WAP 111 is not available for automatic association.

Candidate list 205 is a prioritized list of the available access points 203, based on detected characteristics (e.g., WPA2 is preferred to WEP or no security; a strong signal is preferred to a poor signal). In this embodiment, prioritization is possible based on characteristics derived from the beacon frames sent by hidden and broadcast access points. In the embodiment illustrated in FIG. 2, WAP 105 is the highest ranking available access point. WAP 105 is also a hidden access point, since it does not report its SSID.

In one embodiment, certain information about hidden wireless access points (e.g., an access points SSID) is assumed to be a default or selected value before attempting to determine actual values, and the default or selected value is used in sorting the available access points, including the hidden access points. If the hidden access point is selected as the most preferred (e.g., because of signal strength ranking and security) then the system can attempt to obtain actual values for information associated with the selected hidden access point.

If the hidden access point is not selected (e.g., a non-hidden access point was ranked as the most preferred), then the system can forego obtaining the actual values for the non-selected hidden access point and connect to the selected non-hidden access point. The use of default values for the hidden access points in the scanning and sorting process saves time and power during those processes. In one embodiment, default values used by the sorting process uses optimal assumptions (i.e., prioritized as if the missing characteristic included the best possible answer). In another embodiment, a third party (e.g., hardware vendor, software vendor, etc.) may select a particular value to be used as an assumption for an unknown value.

Figure 3:
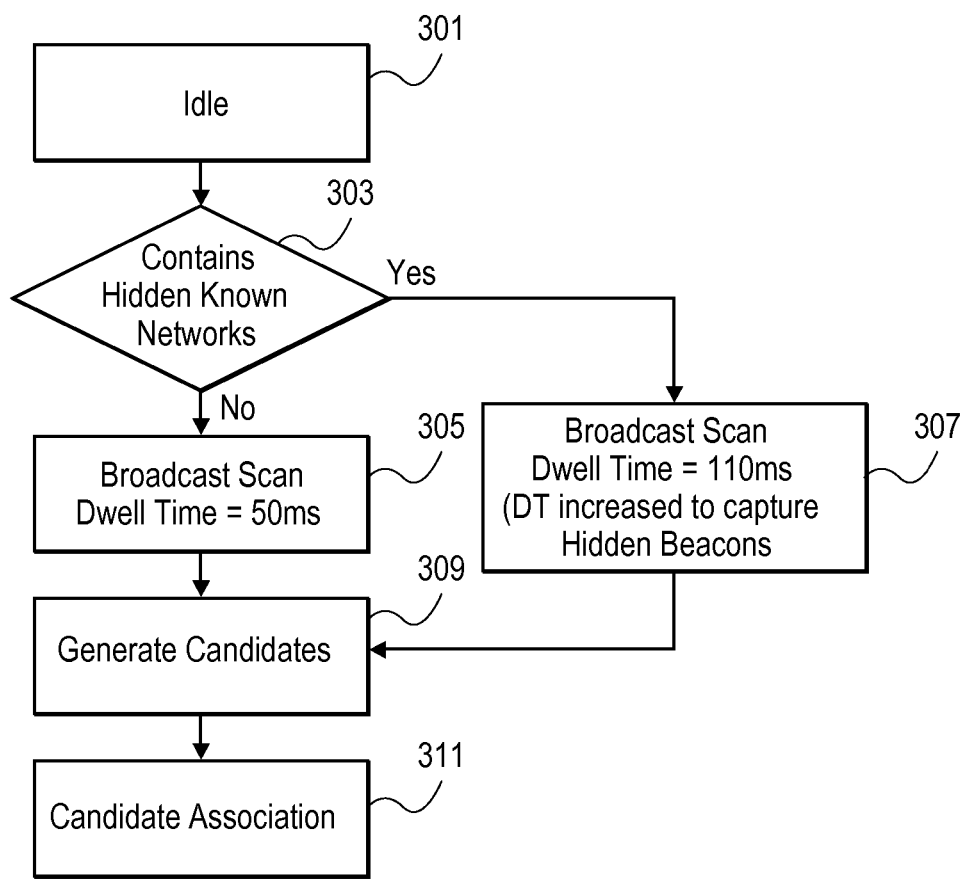
FIG. 3 is a flow chart illustrating a method of automatically associating a device with an access point according to an embodiment of the invention.

FIG. 3 is a flow chart illustrating a method of automatic association with an access point according to an embodiment of the invention. For example, device 101 from FIG. 1 may perform the method illustrated in FIG. 3. At block 301, device 101 is idle. At block 303, in response to, for example, an instruction to select an access point, device 101 determines whether the list of known access points includes a hidden access point. For example, WAP 109 in known access points 201 is known to device 101 as a hidden access point. If the list of known access points includes a hidden access point, device 101 may perform a broadcast scan 307 with an increased dwell time (e.g., 110 ms) to increase the chance of detecting hidden access points. Increasing dwell time increases the chance that a beacon from a hidden access point will be captured. In one embodiment, device 101 must capture a beacon from any available hidden network since they will not respond to an undirected probe request in the broadcast scan. This balance increased detection reliability against the additional time required to perform the broadcast scan. Alternatively, if the list of known access points does not include hidden networks, device 101 may perform a broadcast scan 305 with a shorter dwell time (e.g., 50 ms). Since the device is not interested in hidden networks, it can use a faster undirected probe request instead of waiting for a beacon. This allows the scan to be completed more quickly without affecting the reliability of the scan.

At block 309, the device 101 generates candidate access points. Candidate generation is described in greater detail below in conjunction with FIG. 4. At block 311, the device 101 may select a candidate for association. Candidate association is described in greater detail below in conjunction with FIG. 5.

Figure 4:
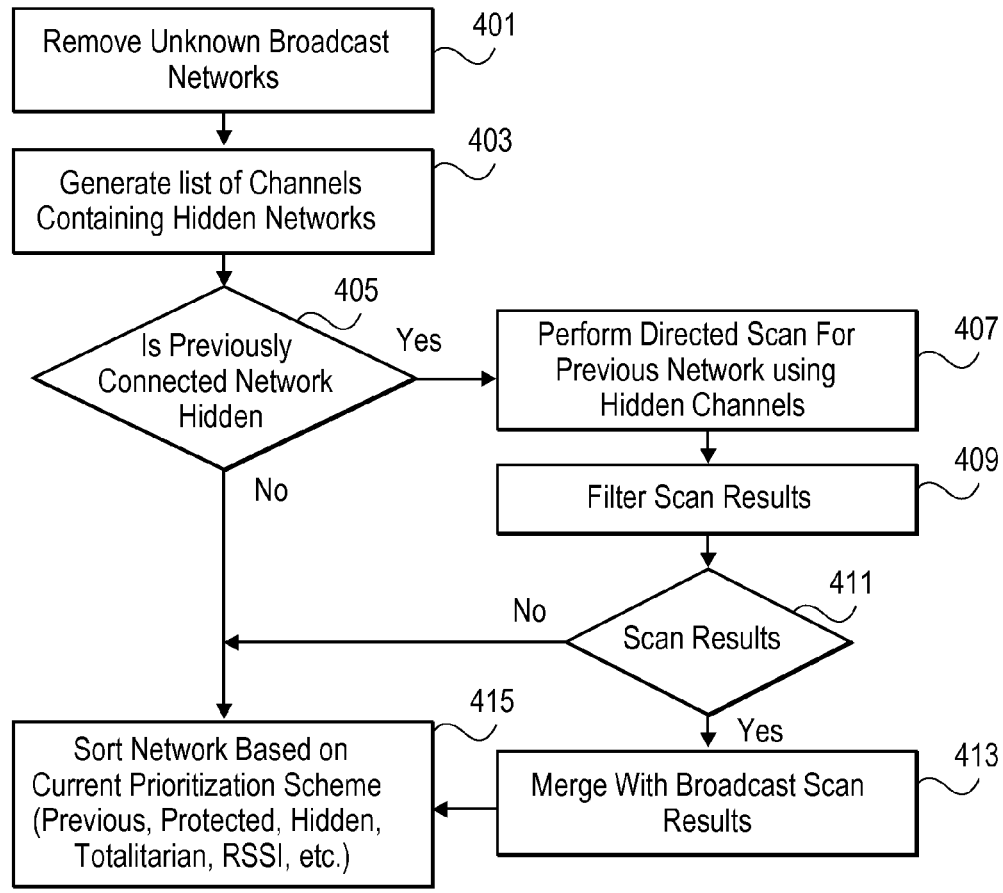
FIG. 4 is a flow chart illustrating a method of generating a list of candidate access points from scan results according to an embodiment of the invention.

FIG. 4 is a flow chart illustrating a method of candidate generation according to an embodiment of the invention. For example, the device 101 may perform the method illustrated in FIG. 4 at block 309 of the method illustrated in FIG. 3.

At block 401, the device 101 removes unknown broadcast networks (i.e., access points) from the list of available access points, resulting in an intermediate candidate list. For example, WAP 107 in available access points 203 in FIG. 2 is an unknown broadcast network, since it reports its SSID (broadcast) and that SSID does not correspond to a network in known access points 201 (unknown.) According to the embodiment illustrated in FIG. 4, candidate list 205 would not include WAP 107 in position three, since it is an unknown broadcast network.

At block 403, the device 101 generates a list of channels containing hidden networks. IEEE 802.11, for example, divides bands into channels. For example, 802.11b uses the 2.4 GHz frequency band, and divides that band into 14 channels. A radio device coupled to device 101 is used to scan these channels during the broadcast scan 307. Some radio devices may permit scanning multiple channels simultaneously. Each access point in the list of available access points 203 is detected on one of the scanned channels. Device 101 records which channel each available hidden network was detected on during the broadcast scan in order to generated a list of channels containing hidden networks. As described below, this may be used to speed up the search for the previously connected network.

At block 405, device 101 determines whether the previously connected network was a hidden network. If the previously connected network was hidden, device 101 performs a directed scan 407 to determine if one of the hidden networks detected during the broadcast scan is the previously connected hidden network. The directed scan is only performed on the channels known to contain hidden networks, as determined at block 403. This reduces the amount of time needed for the directed scan, as channels are not scanned unnecessarily. This scan also has the side effect of identifying any other hidden networks that share similar identifying information (e.g., an SSID). In one embodiment, information from directed scan 407 is added to the list of available access points. That is, the directed scan 407 may identify an available hidden network that is not the previously connected hidden network. Rather than discard this information, it is incorporated into the description of the available hidden network in the list of available access points.

At block 409, the device 101 filters the scan results. Results which don't match the previously connected network, or do not match one of the other known networks are discarded. In some embodiments, there may be additional filtering at this stage to eliminate networks that don't meet certain minimum quality standards (low signal strength, weak security, etc.) If device 101 determines in 411 that filtered results are available, these results are merged into the broadcast scan results at block 413. If the directed scan revealed identifying information about one or more of the previously detected hidden networks, merging the results will "unveil" or reveal the identity of those networks in the list of broadcast scan results. For example, if WAP 105 was the previously connected network and was found by the directed scan, merging the result would make the SSID information for that network available in the list of broadcast scan results. This may reduce the need for some future directed scans.

At block 415, device 101 sorts the networks in the list of available networks based on the current prioritization scheme. Prioritization factors may include whether an available access point is the previously connected access point, whether the access point is protected (e.g., WPA2), whether the access point is hidden, the received signal strength (e.g., RSSI), and other characteristics. These characteristics may also include whether the network is a "totalitarian" network. Totalitarian networks are networks that may have higher-level access or usage restrictions, or may charge an access or usage fee. The various access restrictions and usage fees associated with a totalitarian network may also be considered as part of the prioritization scheme. WiFi hotspots are a common example of totalitarian networks.

Figure 5:
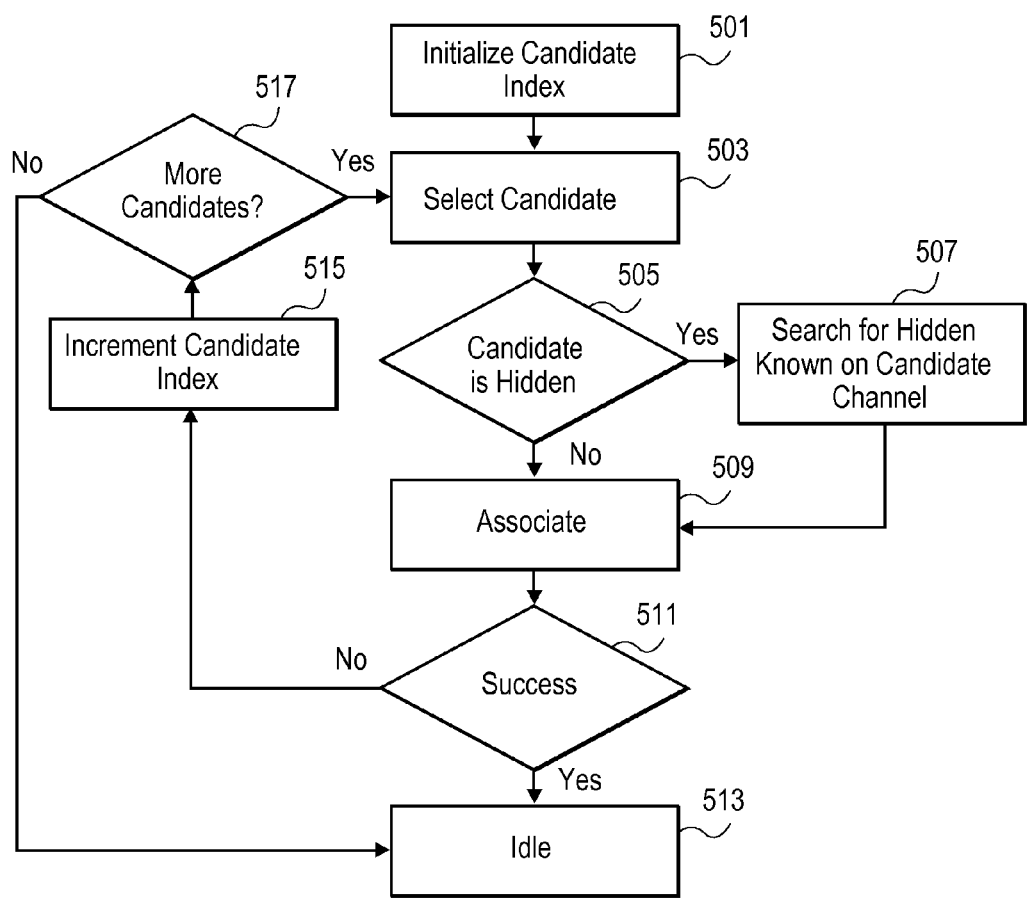
FIG. 5 is a flow chart illustrating a method of associating a device with a candidate access point according to an embodiment of the invention.

In one embodiment, the prioritized list of candidates becomes an input to a method illustrated in FIG. 5. This method may be performed by device 101. At block 501, the candidate index is initialized to point to the highest-priority candidate in the candidate list. At block 503, device 101 selects the top ranking candidate from the candidate index for possible association. For example, in IEEE 802.11, association between a device and an access point refers to a structured interaction. The device authenticates itself to the access point. The access point responds, indicating whether the authentication was successful. The device then requests association with the access point, and if successful, the access point responds with an acceptance and configuration information. Additional higher-layer authentication may then be performed. Once completed, the device will have access to the network through the access point.

At block 505, the device 101 determines whether the selected candidate is hidden. In the case of IEEE 802.11, the absence of an SSID in the candidate record may indicate that the candidate is hidden. If the candidate is hidden, device 101 may perform a search. For example, if the selected candidate is WAP 105 from FIG. 2, the device 101 would perform a search for a known hidden network at block 507. Searching for a known hidden network is described in greater detail below in conjunction with FIG. 6. If the search fails, the device will increment the candidate index at block 515 and move on to the next candidate (if any). If the candidate is not hidden, the device 101 would attempt to associate with the candidate at block 509. If the association is successful 511, the device 101 transitions to an idle state 513. Otherwise, the candidate index in incremented at block 515. After incrementing the candidate index, device 101 checks whether there are more candidates at block 517. If there are more candidates, it selects the next highest ranking candidate at block 503 and repeats the procedure. If there are no more candidates the autojoin attempt fails and the device transitions to the idle state 513.

Except in the case of the previously connected network being hidden (illustrated by block 407 of FIG. 4), the embodiment illustrated in FIG. 5 only performs the time-consuming direct scan of a hidden network if the prioritization analysis indicates that the hidden network is a high ranking candidate. Also in an embodiment of the invention, if the previously connected network is not hidden and the known networks do not include any hidden networks, no hidden networks are directly scanned during the automatic join process, since there is no possibility that one of the available hidden networks is eligible for automatic association. These factors may enhance the network connection responsiveness of a user of the device 101 by decreasing the time spent associating the device with a network. In another embodiment, access points may change their status from hidden to broadcast and vice versa.

The device 101 may determine at block 505 of FIG. 5 that a candidate access point for automatic association is a hidden network (e.g., contains no SSID in the case of IEEE 802.11). If the list of known networks includes hidden networks, the device 101 may perform a directed scan on the channel the hidden candidate was detected to determine if the hidden candidate is one of the known hidden networks.

Figure 6:
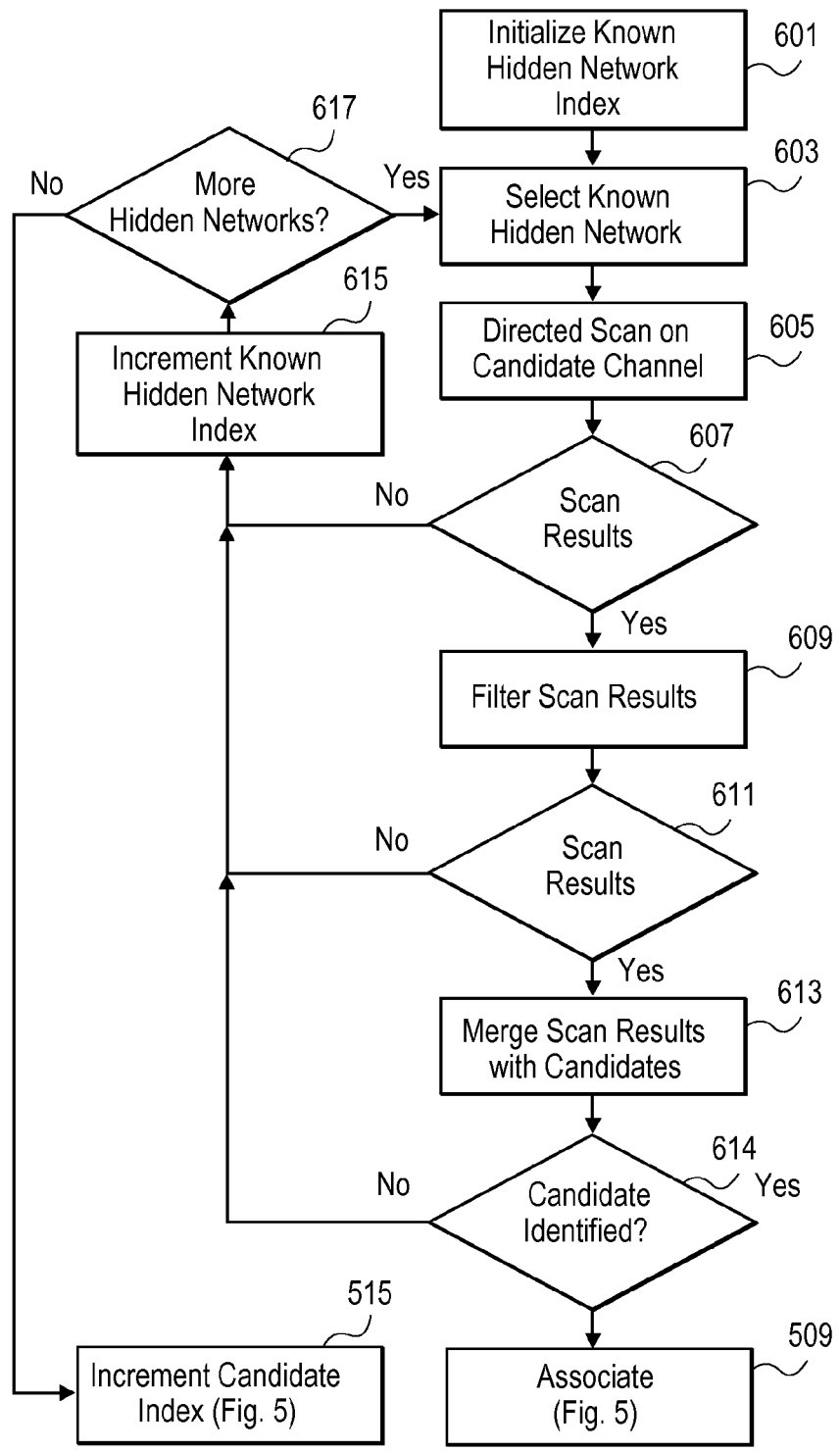
FIG. 6 is a flow chart illustrating a method of searching for known hidden networks using a candidate entry according to an embodiment of the invention.

FIG. 6 is a flowchart illustrating a method of searching for a known hidden network using a candidate. At block 601, the device 101 initializes the known hidden network index. This embodiment of the invention assumes that each known hidden network has an equal probability of being the hidden candidate. In other embodiments, information may be available which allows the list of known hidden networks to be prioritized according to the probability that a known hidden network is the hidden candidate.

At block 603, the device 101 selects a known hidden network. For example, WAP 109 from known networks 201 may be selected. At block 605, the device 101 performs a directed scan on the channel the hidden candidate was detected during the broadcast scan. For example, a directed scan under IEEE 802.11 is a probe request, sent to the hidden access point to acquire information missing from the beacon frames being transmitted by the hidden access points. In this case, that missing information is the SSID (Service Set identifier). The SSID allows the device 101 to determine if the hidden candidate is the selected known hidden network.

At block 607, the device 101 determines whether the directed scan returned any results. If no results were returned, it will increment the index of the known hidden network 615 and move on to search for the next hidden network, if any. If there are results, it will filter them at block 609.

At block 609, device 101 filters the scan results. Results which don't match the current known hidden network, or which don't match one of the other known hidden networks are discarded. In one embodiment, results which don't match an item in the candidate list are also discarded at this point. In some embodiments, additional filtering may be performed at this stage. For example, results below a certain signal strength may be discarded.

At block 611, device 601 checks whether there are scan results remaining after the filtering in block 609. If not, device 101 increments the known hidden network index at block 615 and moves on to the next hidden network in the list, if any. If there are results remaining, device 101 merges the scan results with the list of candidates at block 613. If the directed scan revealed identifying information about one or more of the previously detected hidden networks, merging the results will unveil or reveal the identify of those networks in the list of candidate networks. In addition to potentially detecting the current candidate, this may reveal information about other candidate networks, avoiding the need for later directed scans.

At block 614, device 101 determines whether the current candidate was identified by the directed scan. If not, the device will increment the known hidden network index 615 and move on to the next known hidden network, if any. If the candidate was identified, the device will attempt to associate with the hidden candidate at block 509 of FIG. 5, since the method illustrated in FIG. 6 has confirmed that the hidden candidate is the selected known hidden network. Otherwise, the device 101 increments the known hidden network index at block 615. After incrementing the index, device 101 checks whether there are more known hidden networks in the list at block 617. If so, device 101 returns to block 603 to test any remaining known hidden networks against the hidden candidate. If not, then the candidate was not one of the known hidden networks and the search in FIG. 6 is complete. Device 101 then increments the candidate index at block 515 and moves on to the next candidate, if any.

Figure 7:
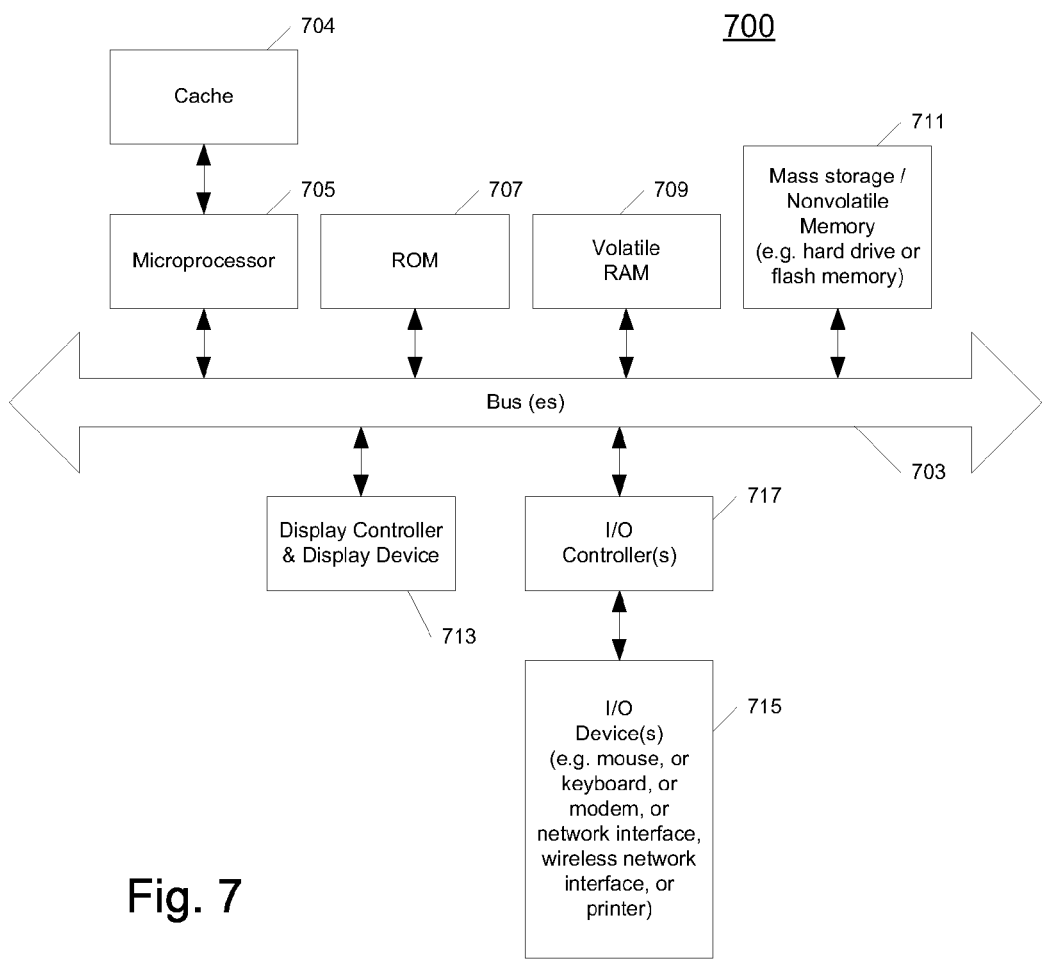
FIG. 7 shows a diagram of a data processing system that may be used with embodiments of the invention.

FIG. 7 shows one example of a data processing system which may be used with one embodiment the present invention. For example, device 101 in FIG. 1 may be implemented with the data processing system illustrated in FIG. 7. Access points 103, 105, and 107 of FIG. 1 may also be implemented using one or more of the data processing system illustrated in FIG. 7. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 is coupled to cache 704. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, wireless network interface, printers and other devices which are well known in the art. A wireless network interface may include a WiFi transceiver, an infrared transceiver, a Bluetooth transceiver, and/or a wireless cellular telephony transceiver. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
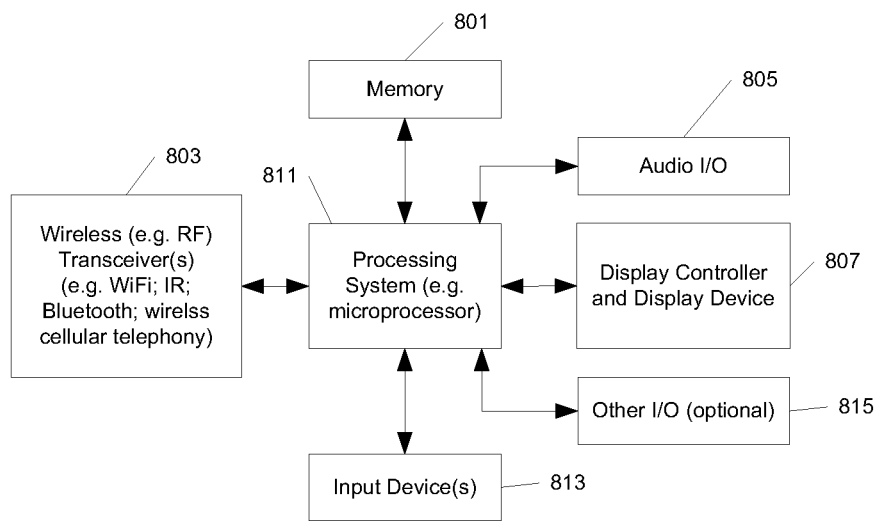
FIG. 8 shows a diagram of a device that may be used with embodiments of the invention.

FIG. 8 shows an example of another data processing system which may be used with one embodiment of the present invention. For example, system 800 may be implemented as part of device 101 as shown in FIG. 1. The data processing system 800 shown in FIG. 8 includes a processing system 811, which may be one or more microprocessors, or which may be a system on a chip integrated circuit, and the system also includes memory 801 for storing data and programs for execution by the processing system. The system 800 also includes an audio input/output subsystem 805 which may include a microphone and a speaker for, for example, playing back music or providing telephone functionality through the speaker and microphone.

A display controller and display device 807 provide a visual user interface for the user; this digital interface may include a graphical user interface which is similar to that shown on a Macintosh computer when running OS X operating system software. The system 800 also includes one or more wireless transceivers 803 to communicate with another data processing system, such as the system 700 of FIG. 7. A wireless transceiver may be a WiFi transceiver, an infrared transceiver, a Bluetooth transceiver, and/or a wireless cellular telephony transceiver. It will be appreciated that additional components, not shown, may also be part of the system 800 in certain embodiments, and in certain embodiments fewer components than shown in FIG. 8 may also be used in a data processing system.

The data processing system 800 also includes one or more input devices 813 which are provided to allow a user to provide input to the system. These input devices may be a keypad or a keyboard or a touch panel or a multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 800 may be a network computer or an embedded processing device within another device, or other types of data processing systems which have fewer components or perhaps more components than that shown in FIG. 8.

In one embodiment, a machine readable storage medium such as mass storage 711 or RAM 709 stores instructions which when executed by a processor such as microprocessor 705 or processing system 811, causes the processor to perform a method such as the methods illustrated in FIGS. 3, 4, 5, and 6.

In another embodiment, a method such as the methods illustrated in FIGS. 3, 4, 5, and 6 may be performed by a data processing system such as the data processing systems of FIG. 7 or FIG. 8.

In still another embodiment, the list of known access points, the list of available access points, the candidate index, and the known hidden network index may be stored in data structures in a memory such as RAM 709 and accessed by the processor such as processor 705 and used or referred to by instructions executing on the processor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    detecting available access points;
    generating a list of candidate access points from the available access points, wherein the generating the list of candidate access points comprises:
        generating a list of channels, wherein each channel in the list of channels includes at least one hidden access point from the available access points;
        responsive to determining a last connected access point was hidden, performing a directed scan for the last connected access point, wherein the directed scan is performed over channels in the list of channels; and
        responsive to receiving a response from at least one access point, adding the at least one access point to the list of candidate access points;
    performing a directed scan for a known access point over a channel of a hidden candidate access point selected from the list of candidate access points; and
    connecting to the hidden candidate access point in response to determining that the hidden candidate access point is the known access point.

2. The method of claim 1, wherein the detecting the available access points comprises:
    performing a broadcast scan to capture beacons transmitted by the available access points.

3. The method of claim 2, further comprising:
    determining a list of known access points includes a known hidden access point; and
    wherein the broadcast scan is performed using a longer dwell time in response to the determining the list of known access points includes the known hidden access point.

4. The method of claim 3 further comprising:
subsequent to the performing the directed scan for the known access point over the channel:
discovering a second set of available access points from the directed scan;
filtering the second set of available access points, wherein the filtering comprises: discarding one or more access points from the second set of available access points that fail to match any known access point in the list of known access points; and
responsive to determining access points remain in the second set of available access points, merging the second set of access points with the list of candidate access points;
wherein the performing the directed scan for the last connected access point comprises transmitting a probe request comprising a service set identifier (SSID) of the last connected access point; and
wherein the performing the directed scan for the known access point comprises transmitting a probe request comprising a SSID of the known access point.

5. The method of claim 1, further comprising:
removing unknown broadcast access points from the list of candidate access points.

6. The method of claim 1, wherein the generating the list of candidate access points comprises:
prioritizing the list of candidate access points based at least in part on a prioritization scheme.

7. The method of claim 6, wherein the prioritization scheme comprises at least one of: type of encryption, signal strength, and data rate.

8. A non-transitory machine readable storage medium storing instructions which when executed by a processor cause the processor to perform a method, the method comprising:
detecting available access points;
generating a list of candidate access points from the available access points, wherein the generating the list of candidate access points comprises:
generating a list of channels, wherein each channel in the list of channels includes at least one hidden access point from the available access points;
determining a last connected access point was hidden;
performing a directed scan for the last connected access point, wherein the directed scan is performed over channels in the list of channels; and
responsive to receiving a response from at least one access point, adding the at least one access point to the list of candidate access points;
performing a directed scan for a known access point over a channel of a hidden candidate access point selected from the list of candidate access points; and
connecting to the hidden candidate access point in response to determining the hidden candidate access point is the known access point.

9. The non-transitory machine readable storage medium of claim 8, wherein the method further comprises:
sorting the list of candidate access points by a set of criteria, wherein the set of criteria comprises at least a signal strength of each detected wireless access point available access points.

10. The non-transitory machine readable storage medium of claim 9, wherein the hidden candidate access point comprises a highest ranking candidate access point according to the sorting of the list of candidate access points.

11. The non-transitory machine readable storage medium of claim 8, wherein the performing the directed scan for the known access point over the channel of the hidden candidate access point comprises:
determining the hidden candidate access point does not comprise a service set identifier (SSID);
selecting the known access point, wherein the known access point is hidden;
transmitting a probe request for the known access point;
comparing a probe response from the hidden candidate access point to the probe request for the known access point; and
determining the detected wireless access point is the known access point.

12. A data processing system comprising:
a processor;
a memory coupled to the processor through a bus;
instructions stored in the memory to be executed by the processor and cause the processor to:
detect available access points;
generate a list of candidate access points from the available access points, wherein the generating the list of candidate access points comprises:
generating a list of channels, wherein each channel in the list of channels includes at least one hidden access point from the available access points;
determining a last connected access point was hidden;
performing a directed scan for the last connected access point, wherein the directed scan is performed over channels in the list of channels; and
responsive to receiving a response from at least one access point, adding the at least one access point to the list of candidate access points;
perform a directed scan for a known access point over a channel of a hidden candidate access point selected from the list of candidate access points; and
connect to the hidden candidate access point in response to determining the hidden candidate access point is the known access point.

13. A non-transitory machine readable storage medium storing instructions to be executed by a processor and cause the processor to perform a method, the method comprising:
receiving beacons transmitted by wireless access points;
responsive to determining that at least one wireless access point transmitted incomplete data,
substituting assumed data for incomplete data;
sorting wireless access points based at least in part on the assumed data, wherein the wireless access points comprise the at least one wireless access point;
selecting the at least one wireless access point based at least in part on the sorting; and
obtaining complete data from the selected at least one wireless access point;
wherein obtaining complete data comprises performing a directed scan of the selected at least one wireless access point; and
wherein the obtained complete data comprises a service set identifier (SSID) of the selected at least one wireless access point.

14. The non-transitory machine readable storage medium of claim 13, wherein the sorting is based at least in part on a prioritization scheme.

15. The non-transitory machine readable storage medium of claim 14, wherein the assumed data comprise optimal assumptions for a particular field of missing data.

* * * * *